United States Patent Office 3,209,587
Patented Oct. 5, 1965

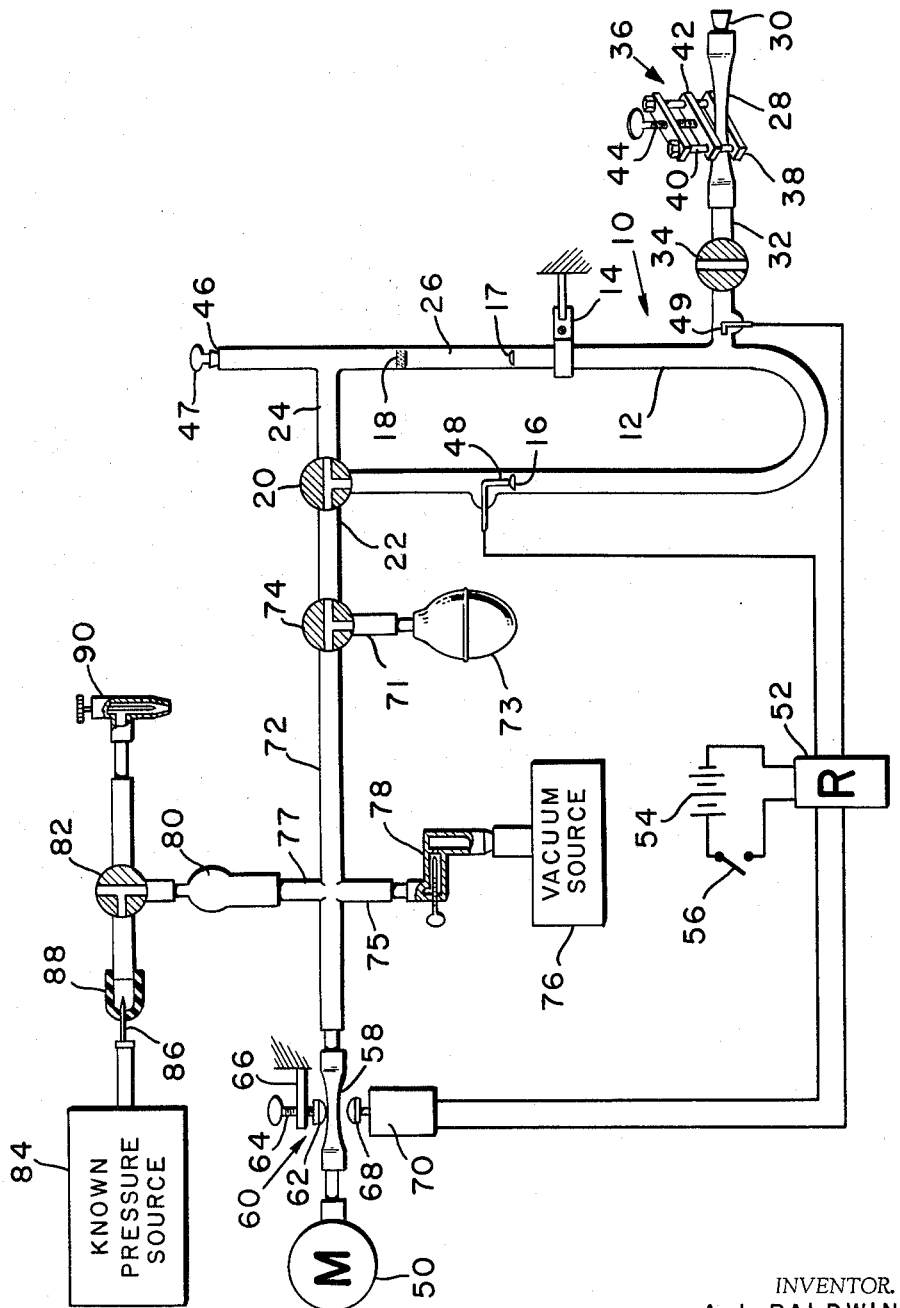

3,209,587
VOLUMETRIC APPARATUS
Andrew J. Baldwin, Raleigh, N.C., assignor, by mesne assignments, to Monsanto Company, a corporation of Delaware
Filed Apr. 20, 1962, Ser. No. 189,015
20 Claims. (Cl. 73—149)

The present invention relates generally to apparatus for making volumetric determinations and more particularly to a simple, rapid volumenometer for use in making accurate and rapid volumetric determinations of small, irregularly shaped samples, particularly fiber samples.

One of the most useful physical properties for evaluating a solid material is its density. In industry, for example, density values are helpful in determining the identity, purity, and physical structure of both raw materials and finished products. Generally, two measurements are required, that of weight and volume. Density is then calculated on a weight per unit volume basis. Although precise weight measurements may be readily attained with modern day balances, volumetric determinations have been found to entail considerably more difficulty, often involving tedious and time-consuming procedures executed by a skillful operator to assure reasonably accure results. One useful method of making volumetric determinations of irregularly-shaped or powdered samples involved the immersion of such sample in an appropriate liquid followed by a measurement of the increase in liquid volume. This technique is applicable to a variety of materials, but is relatively slow and inconvenient, and if not practiced by a skillful operator, may lead to highly inaccurate determinations. For example, the temperature of the liquid must be carefully regulated and exceptional care must be taken to eliminate all air bubbles. In addition, the true volume of some solids is not obtained because of the inability of the liquid to penetrate surface pores. If a gas is used as the measuring fluid, the errors caused by the surface pores are eliminated but the change in volume is difficult to measure accurately. Also, many of the devices designed to employ gas as the measuring fluid are handicapped by a high sensitivity to temperature variations as well as by the necessity of making extremely exact absolute volume determinations. All of the various methods and apparatus for making volumetric determinations of small, irregularly shaped samples are directed to a continuing and keenly felt need for a means capable of rendering such determinations in a rapid yet accurate fashion without the necessity of a skilled operator.

It is, therefore, an object of the present invention to provide a simple, yet rapid and accurate volumenometer for measuring the volumes of irregularly shaped samples.

A further object of the present invention is to provide a gas volumenometer which is so designed as to operate on the basis of Boyle's gas law to give accurate readings for small volumes with heretofore unattainable rapidity.

Still a further object of the instant invention is to provide a gasometric volumenometer which employs a liquid-impermeable-gas-permeable disc or partition which greatly simplifies design and eliminates known sources of significant error.

Another object of the instant invention is to provide a volumenometer whose manipulation may be mastered quickly and accurately by the unskilled operator.

A still further object of this invention is to provide a volumenometer having a means for adjusting the level of the measuring liquid confined therein so as to maintain such level at a constant point.

Yet another object of this invention is to provide a gas volumenometer having a liquid-impermeable-gas-permeable partition and electrically actuated means for automatically isolating desired pressure measurements at the moment predetermined conditions are satisfied.

A still further object of the present invention is to provide a system for making volumetric determinations of relatively small, irregularly shaped objects with a rapidity and accuracy heretofore unattainable, which system is designed to measure expanded gas pressures in automatic fashion, which by virtue of Boyle's gas law, may be quickly and accurately converted to measures of sample volumes and which system is virtually insensitive to small temperature variations.

According to the present invention, the foregoing and other objects are attained by an apparatus for making volumetric determinations which comprehends the use of a continuous, substantially rigid tubular member, conveniently formed of glass, provided with gas-permeable-liquid-impermeable partition and the use of an automatic, electrically actuated pressure indicating mechanism to give accurate and rapid expanded gas pressure determinations which may be quickly converted to measures of sample volume. Basic to the function of this invention is the principle that, for a U-tube partly filled with liquid, the gas pressure is equal in the arms of the U-tube whenever the liquid columns balance each other, and this is true whether one or both arms are closed, whatever the pressure may be. Thus, measurement of the pressure over one liquid column effectively measures the pressure over the other liquid column if the columns are balanced.

Referring now to the drawing, there is shown one possible embodiment of the present invention, which is seen to comprise a pressurizing system, an evacuating system, a pressure indicating system, and a volumenometer, generally indicated by arrow 10. The volumenometer comprises essentially a continuous tubular member, conveniently formed of glass, here shown as being substantially U-shaped, which tubular member is mounted to pivot, for reasons that shall later become apparent, about an axis perpendicular to the plane thereof by means of a rotatably mounted clamp 14. It should be noted that the particular configuration of the continuous tubular member 12 is not considered critical and it is only essential that the member be of such configuration that it is possible to orientate same to provide a pair of substantially vertically extending columns of liquid 16, 17 which liquid should be of the electrically conductive variety, such as mercury. Essential to the use of such a tubular member in the measurement of expanded gas pressures is the provision of a gas-permeable-liquid-impermeable partition 18 mounted in fluid-tight relationship and extending transversely within the walls of said tubular member. Such a partition may take the form of a fritted glass disc consisting of partly fused, but yet unvitrified, substituents commonly used in glass manufacture, which material is well known to resist the passage of various liquids, such as mercury, under relatively low pressure while allowing the passage of gases in relatively unrestricted fashion. Of course, any other materials possessing the qualities of gas-permeability-liquid-impermeability at low pressure differentials may be employed in the practice of this invention. Also mounted within tubular member 12, but spaced from the partition 18, is a multi-positionable valve 20, which is provided with a tubular connector extension 22, which extension may comprise any suitable tubular material capable of withstanding vacuum pressures without collapsing and low gauge pressures. Valve 20 is illustrated in the form of a conventional three-way stopcock capable of being positioned to intercommunicate any combination of three passageways or of closing each passageway off from the others. Considering the tubular member 12 to be mounted in its operative position as shown in the drawing, it is seen that valve 20 and partition 18 serve to define two chambers within tubular member 12, an upper, preferably smaller, sample chamber 24, and a lower, relatively larger expansion chamber 26. In the lower regions of chamber 26 there is provided another feature important to the practice of this invention, namely, a means for readily adjusting the balance level of the mercury or other working liquid within chamber 26. Such a level adjusting means may comprise a mercury filled, flexible tubing 28 one end of which is sealed by a conventional stopper 30, or other suitable closure means, and the other end of which is placed in selective communication with chamber 26 by means of tubing 32 and a two-way valve 34. Mounted exteriorly of flexible tubing 28 and engaging the outer surface thereof is an adjustable hose clamp 36 which may conveniently comprise a base portion 38, a carriage member 40, and an adjustable upper jaw 42 which is threadably engaged with carrier 40 by means of an integrally mounted, threaded stem portion 44. The purpose and mode of operation of the level adjusting means 36 will become apparent from a later following description of a typical measuring run.

The sample chamber 24 is provided with a stoppered opening 46, whereby samples may be introduced into the sample chamber preliminary to making a volumetric determination. Stopper 47 may desirably be coated with a suitable stopcock grease to insure air-tight engagement with said opening.

Another highly useful feature of the present invention is the provision of an electrically actuated arrangement for automatically and instantaneously recording desired pressures in a manner to minimize possible disturbance of the pressure indicating device. Such a means essentially comprises a pair of vertically spaced contacts 48, 49 preferably made of nickle-coated tungsten, or other suitable metals, to insure an air tight seal between the contacts and the wall of the tubular member. These contacts are electrically interconnected to a pressure measuring device 50 by means of a powered relay 52. For convenience, the power source 54 for relay 52 is provided with a switch 56 in order to inactivate the relay during preparations preliminary to making a sample run. The pressure measuring device 50 may be in the form of any suitable manometer, preferably having a vernier arrangement capable of giving readings to an accuracy of .1 mm. of mercury. At a point intermediate manometer 50 and the multi-positionable valve 20, there is provided a relatively flexible segment of tubing 58 much like that employed in the level adjusting means previously described. The flexible tubing is engaged by a solenoid-actuated clamp, generally indicated by arrow 60, which may conveniently comprise an adjustable stationary upper jaw 62 which is maintained in any desired position by means of an integral, threaded stem portion 64 which threadably engages a fixed bracket 66. Lower jaw 68 of the solenoid-actuated adjustable clamp assembly is integrally connected to solenoid 70 and actuated thereby. It is, therefore, seen that upon occurrence of the conditions that will cause relay 52 to operate, solenoid 70 will be actuated to thrust lower jaw 68 upwardly against stationary upper jaw 62 to close off flexible tubing 58, thereby serving to isolate the pressure measuring device 50 from the remainder of the system. Suitable tubing 72, which serves to interconnect the pressure measuring device with the tubular member 12 by way of the multi-positionable valve 20, contains three branch portions, which may be arranged in any desired order along tubing 72 and which serve to intercommunicate tubular member 12 with controllable pressure and vacuum sources. It should here be noted that tubing 72 is employed in a manner that will accommodate the pivoting motion of tubular member 12 about clamp 14. This may be accomplished in any of several readily apparent ways, such as using flexible tubing or providing a rotatable connector between tubing 72 and tubular member 12. One pressure source comprises a resilient, gas-filled squeeze bulb 73 and a three-way valve 74 selectively interconnecting the bulb with tubing 72 by way of branch tubing 71. The second of the three branches 75 is made to communicate with a source of vacuum 76, which vacuum may be accurately regulated by means of a conventional needle valve 78. The third branch 77 communicates by way of drying tube 80 to three-way valve 82, which valve may be manipulated to selectively communicate tubular member 12, by way of tubing 72, with a known pressure source 84, which can be measured with the manometer, M, on the one hand, and, on the other hand, with leak valve 90, which may take the same form as needle valve 78. This leak valve 90 may be accurately adjusted to provide a constant leak of air or any other gas supplied at a known pressure into the system at the rate of approximately 2 to 3 mm. of mercury per minute. The known pressure source 84 communicates with the system by way of hypodermic needle 86 and a rubber, air-tight cap 88 to thereby prevent sudden surges of the measuring liquid 17 within tubular member 12 upon communication of the known pressure source 84 therewith.

Turning now to the operation of the above described apparatus, it will be found convenient to refer to the varying positions of the three-way valves 20, 74 and 82 in terms of clock movements wherein what may be considered the upstanding portion of the T-shaped passageways of such valves may be likened to the hour hand of a clock. Thus, valve 20 and valve 74 are shown in a 6 o'clock position, whereas valve 82 is shown in a 9 o'clock position. These positions will be designated in the manner of 20–6, signifying that valve 20 is in the 6 o'clock position illustrated in the drawing.

Prior to describing the operational sequence of the invention, it will be desirable to indicate its theoretical basis. Consider a hollow cylinder closed at one end and fitted with a piston. One cubic centimeter of gas is trapped in the cylinder at atmospheric pressure. Expand the gas to a volume of two cubic centimeters isothermally, and the gas pressure will be reduced to .5 atmosphere according to Boyle's law. Now return the piston to the one centimeter position, but displace part of the gas with .5 cubic centimeters of solid material so that .5 cubic centimeters of gas at the unexpanded pressure is left in the cylinder. Expand the gas to the same two cubic centimeter position isothermally, and the gas pressure becomes .333 atmospheres, again according to Boyle's law. Since the two expansions were otherwise similar, .5 cubic centimeters of solid material caused a pressure difference of .167 atmosphere or 127 mm. of mercury. The possibility of a sensitive volume-measuring device becomes readily apparent.

According to the present invention, an analogous expanded volume is defined by sample chamber 24 and that portion of the expansion chamber 26 between partition 18 and the balance level of the mercury 17, which expanded gas volume will be designated as V, in ccs. Also, the following designations will be employed:

$V_0$=Volume of sample chamber 24, in ccs.

$\Delta V$=Sample volume, in ccs.

$A$=Pressure of expanded volume without sample, in mm. of mercury $B$=Known, unexpanded pressure, in mm. of mercury
$C$=Pressure of expanded volume, with sample, in mm. of mercury Then, according to Boyle's gas law at constant temperature:

$$BV_0 = AV$$

$$\frac{A}{B} = \frac{V_0}{V} = K; \ V_0 = KV$$

$$B(V_0 - \Delta V) = B(KV - \Delta V) = C(V \Delta V)$$

$$KBV - CV = B\Delta V - C\Delta V$$

$$V(KB - C) = \Delta V(B - C)$$

$$\Delta V = \frac{KB - C}{B - C} \cdot V \quad \text{(Working Equation)}$$

Periodic calibration of the instrument is accomplished simply by using the above set forth working equation in reverse to solve for V. This is accomplished by measuring pressures A, B and C in a manner to be described, pressure C being measured while employing standard samples of exactly known volume, $\Delta V$. Since K is defined as the ratio of pressures A to B and since $\Delta V$ is known, the working equation may be solved for V, the expanded gas volume without a sample present. Since K is also the ratio of volumes $V_0$ to V, sample chamber volume $V_0$, an instrument constant, is also readily calculated. A few practice measurements of $V_0$ will give a good average value and, when this is established, the instrument is said to be calibrated.

Ball bearings have been found to make ideal standard samples. Bearings may be manufactured as nearly perfect spheres and it is easy to measure the diameter of a bearing to within .0001 inch using a micrometer. Also, pure aluminum wire, which is readily attainable, is an excellent volumetric standard for calibration purposes, the density of aluminum being 2.702 grams per cubic centimeter. If a sample of wire is weighed accurately, the volume of the sample may be easily calculated.

In operation, prior to making a run with a sample present, mercury level 16 is adjusted by manipulation of the level adjusting mechanism so that, at the moment the surface of mercury 16 falls away from contact with upper electrical contact 48, the mercury levels 16 and 17 are exactly balanced. This is accomplished in the following manner. Initially set up the system so that power switch 56 is opened, needle valve 78 is fully closed, and the following valve settings are made: 82–9, 74–12, 20–6, and 34 opened; both mercury levels are now balanced at a known pressure, B, by virtue of their communication with known pressure source 84 and it is now determined to cause the mercury to break contact at the moment the mercury columns are balanced. Therefore, set 82–12 to close off leak valve 90 and the known pressure source 84 from the system and set 20–9 to close off the right-hand column of mercury. Open needle valve 78 slowly until upper contact 48 is immersed in approximately one centimeter of mercury, close needle valve 78, close power switch 56 and set 82–6, clockwise. The left-hand column will then drop to a position of balance with the right-hand column. If break with contact 48 does not occur when the balance position is reached, the level adjusting mechanism is manipulated to remove mercury from the tubular member 12 until break does occur. This is accomplished by turning threaded stem portion 44 to raise upper jaw 42. If contact break occurs, but the mercury in the left hand column continues to fall away from the contact, the level adjusting mechanism is manipulated to add mercury until contact is just barely made. Contact breaking is signified by actuation of relay 52 to a position to energize solenoid 70, thereby actuating adjustable clamp 60 to seal flexible tube 58 and thereby isolate the pressure measuring device 50 to indicate the pressure existing in the system at the instant contact breaking occurs. To insure that the shift in the mercury level occurring in tubular member 12 does not outrun the pressure measuring device 50, needle valve 90 effects a slow, controlled admission of pressure from outside the system. The above outlined steps may have to be repeated two or three times until a satisfactory level is attained. Valve 34 is then turned to its closed position and is not reopened until mercury level adjustment again becomes necessary.

The instrument is now ready to receive a sample of unknown volume $\Delta V$. Any samples introduced into the system should be meticulously dried to minimize the possibilities of generating vapor pressures which will result in erroneous determinations. Transfer of the sample to the instrument should be performed as quickly as possible to minimize sample contact with atmospheric moisture. Once the sample has been placed in sample chamber 24, opening 46 is securely stoppered. To insure that the instrument contains nothing but dry gases, it is flushed in the following manner: turn 82–10.5, 74–6, and 20–6; open needle valve 78 until upper contact 48 is immersed in approximately one centimeter of mercury; close needle valve 78 and turn 82–9; repeat this sequence several times so as to insure a complete exchange of the gas confined within the instrument.

The operator may now proceed to determine the pressure of the expanded gas with a sample present. This is accomplished in the following fashion: set 20–6 and tilt the tubular member 12 about pivotal mounting 14 until mercury level 17 abuts partition 18; set 20–9 and return the tubular member 12 to its normal, vertical position. The mercury level will then descend to a point intermediate partition 18 and its normal balance level. Set 74–3 from its normal 74–12 position. Gas-filled bulb 73 is squeezed to force mercury level 17 firmly against partition 18. While maintaining bulb pressure, set 20–10.5 clockwise; release bulb 73 and set 74–12, 82–9 and 20–12, whereupon the right-hand column of mercury is subjected to the known source of pressure 84, but is held against the partition by the greater pressure exerted by actuation of the squeeze bulb. Record the barometric pressure as read on manometer 50 to the nearest .1 mm.; this constitutes pressure B in the working equation. Immediately set 20–9, counterclockwise, 82–12, and open needle valve 78 slowly to exert a vacuum over the left-hand column sufficient to immerse the upper contact 48 in approximately one centimeter of mercury, whereupon needle valve 78 is fully closed; set 82–3 clockwise. The right-hand column of mercury is now subjected to a pressure greater than exists in the rest of the system, and the left-hand column is in fluid communication with leak valve 90 by way of valves 20, 74, drying tube 80 and valve 82. Close power switch 56 and wait for relay 52 to activate and operate the solenoid-actuated, adjustable clamp 60 when there is a break between the upper electrical contact 48 and the left-hand mercury level 16. Upon relay activation, read the pressure measuring device 50 to the nearest .1 mm. and record the result as pressure C, i.e., the pressure of the expanded gas with a sample present. Open switch 56 and set 20–6 and 82–9; the system will now return to the pressure of known pressure source 84. Occasionally repeat the same sequence of operations with no sample in chamber 24, but record the final pressure reading as pressure A. The ratio of A to B is K. K is determined only periodically. The recorded values of B and C, and the calculated values K and V, are then substituted into the above set out working equation, which may then be quickly solved for sample volume $\Delta V$.

It has been found that, with a minimum of practice, an unskilled operator may quite easily run through the above sequence six or more times per hour and still obtain highly accurate results.

Obviously, numerous modifications and variations of the present invention are possible in the light of the above teachings. It is, therefore, to be understood that within

What is claimed is:

1. An apparatus for use in making volumetric determinations, comprising a continuous tubular member having a pair of substantially upstanding portions, upper and lower portions interconnecting the upper and lower ends, respectively, of said upstanding portions, a substantially gas-permeable-liquid-impermeable partitioning means mounted within and fully partitioning one of said upstanding portions at a point below the juncture of said upstanding portion with said upper interconnecting portion, selectively operable closure means mounted at a point intermediate the juncture of the other of said upstanding portions with said upper interconnecting portion and said gas-permeable liquid-impermeable means, an opening formed in said tubular member intermediate said closure means and said gas-permeable-liquid-impermeable means.

2. An apparatus for use in making volumetric determinations comprising a continuous tubular member having a pair of substantially upstanding portions and a pair of portions interconnecting adjacent ends of said upstanding portions, a substantially liquid-tight-gas-permeable means extending transversely within and fully partitioning one of said upstanding portions, selectively operable closure means mounted at a point intermediate the juncture of the other of said upstanding portions with said upper interconnecting portion and said liquid-tight-gas-permeable means, and an opening formed in said tubular member intermediate said closure means and said liquid-tight-gas-permeable means.

3. An apparatus for use in making volumetric determinations comprising the combination of a continuous tubular member having a pair of substantially upstanding portions, partitioning means mounted within and fully partitioning one of said upstanding portions and operative to obstruct passage of liquid while permitting the passage of gas therethrough, selectively operable closure means mounted within the other of said upstanding portions and spaced from said partitioning means, an opening formed within said tubular member intermediate said partitioning means and said closure means.

4. An apparatus for making volumetric determinations comprising the combination of a continuous, substantially rigid tubular member, a liquid-tight-gas-permeable partitioning means extending transversely within and fully partitioning said tubular member, a selectively operable closure means mounted within said tubular member and spaced from said partitioning means, a tubular connector means mounted in fluid-communication with said closure means, said tubular member, partitioning means and closure means defining first and second chambers within said tubular member, and an opening formed in said tubular member to communicate with the interior of said first chamber to thereby define a sample chamber.

5. The apparatus as defined in claim 4 wherein said partitioning means comprises a fritted glass disc mounted to extend transversely within said tubular member in liquid-tight relation therewith.

6. An apparatus for use in making volumetric determinations comprising a substantially U-shaped tubular member having a pair of upstanding leg portions, a tubular cross-member interconnecting the upper portions of the leg portions of said U-shaped tubular member, a liquid-tight-gas-permeable fritted glass disc extending transversely within and fully partitioning one of said pair of leg portions at a point below the juncture of said leg portion with said cross-member, a selectively operable closure means mounted within the other of said pair of leg portions at the juncture with said cross-member, said one leg portion terminating in a closable opening at a point above said juncture with said cross-member.

7. The apparatus as defined in claim 4 and further comprising, in combination, mounting means pivotally mounting said tubular member for selective pivoting about an axis substantially perpendicular to the general plane of said tubular member.

8. The apparatus as defined in claim 4 which further comprises a removable closure means mountable within said opening in fluid-tight relation therewith, a pair of vertically spaced electrical contacts mounted to extend through the wall of said tubular member into said second chamber.

9. The apparatus as defined in claim 4 and further including a liquid level adjusting means comprising a flexible tube having one end in fluid communication with the said second chamber, the other end of said flexible tube being sealed, adjustable clamp means engaging the outer surface of said flexible tube, whereby said flexible tube may be controllably deformed by manipulation of said adjustable clamp to vary the fluid level within said tubular member, and valve means interposed between said flexible tube and said tubular member.

10. The apparatus as recited in claim 4 wherein said selectively operable closure means comprises a three-way valve selectively operable between a first position wherein said first and second chambers are placed in fluid communication with one another to the exclusion of said tubular connector means, a second position wherein said first and second chambers and said tubular connector means are placed in fluid communication with one another, a third position wherein said tubular connector means is placed in fluid communication with said first chamber to the exclusion of said second chamber, a fourth position wherein said second chamber is placed in fluid communication with said tubular connector extension to the exclusion of said first chamber, and an intermediate fifth position wherein said first and second chambers and said tubular connector means are rendered fluidly non-communicative, each with the others.

11. The apparatus as set forth in claim 8 and further comprising a pressure measuring device in fluid communication with said tubular connector means, a segment of flexible tubing interposed between said pressure measuring device and said tubular connector means, solenoid-actuated clamp means engaging said flexible tubing and operative between a tube sealing position and a position permitting reduced fluid passage through said tubing, relay means electrically interconnecting said solenoid-actuated clamp and said contacts, an electrically conductive fluid contained within said second chamber, whereby, upon disengagement of said fluid from the uppermost of said vertically spaced contacts, said relay is operated to actuate said solenoid-actuated clamp into its tube closing position, thereby sealing off said pressure measuring device from said tubular member to facilitate undisturbed pressure readings.

12. An apparatus as defined in claim 11 wherein said conductive fluid is maintained at that level at which equal pressures exist on both surfaces at the moment of disengagement of said fluid from the uppermost of said electrical contacts, whereby, upon such disengagement, said pressure measuring device is rendered fluidly non-communicative with said tubular member at the moment equal pressures are caused to exist upon both surfaces of said fluid.

13. An apparatus as recited in claim 4 and further comprising a source of known pressure, leak valve means having a predetermined leak rate, three-way valve means selectively interconnecting said known pressure source and said leak valve means with said tubular member by a way of said tubular connector means, manually actuated, resilient, gas-filled bulb means interposed between said three-way valve means and said tubular member and in fluid communication therewith, valve means interposed between said bulb means and said tubular member, and a controlled source of vacuum selectively communicable with said tubular member.

14. An apparatus as defined in claim 4 and further comprising a pair of vertically spaced electrical contacts mounted to extend through the wall of said tubular member into said second chamber, a liquid level adjusting means having a flexible tube, one end of which is in fluid communication with said second chamber at a point below the uppermost of said contacts, the other end of said flexible tube being sealed, adjustable clamp means engaging the outer surface of said flexible tube, whereby, upon controlled deformation of said flexible tube by manipulation of said adjustable clamp, the level of a fluid confined within and partially filling said tubular member can be maintained at that level at which equal pressures exist on both surfaces of such fluid at the moment of disengagement of such fluid from the uppermost of said electrical contacts, and valve means interposed between said flexible tube and said tubular member.

15. An apparatus for making volumetric determinations comprising the combination of a continuous, substantially rigid tubular member, a liquid-tight-gas-permeable fritted glass disc mounted to extend transversely within said tubular member in liquid-tight-relation therewith, a selectively operable closure means mounted within said tubular member and spaced from said partitioning means, a tubular connector means mounted in fluid-communication with said closure means, said tubular member, partitioning means and closure means defining first and second chambers within said tubular member, and an opening formed in said tubular member to communicate with said first chamber to thereby define a sample chamber, mounting means pivotally mounting said tubular member for selective pivoting about an axis substantially perpendicular to the general plane of said tubular member, and liquid level adjusting means in fluid communication with said second chamber.

16. The apparatus defined in claim 15 wherein said liquid level adjusting means is further characterized by a flexible tube, one end of which is in fluid communication with said second chamber, the other end of which is sealed, adjustable clamp means engaging the outer surface of said flexible tube, whereby said flexible tube may be controllably deformed by manipulation of said adjustable clamp means to vary the level of a fluid confined within said tubular member.

17. The apparatus defined in claim 15 and further comprising a pair of vertically spaced electrical contacts mounted to extend through the wall of said tubular member into said second chamber.

18. The apparatus defined in claim 16 wherein said selectively operable closure means comprises a three-way valve selectively operable between a first position wherein said first and second chambers are placed in fluid communication with one another to the exclusion of said tubular connector means, a second position wherein said first and second chambers and said tubular connector means are placed in fluid communication with one another, a third position wherein said tubular connector means is placed in fluid communication with said first chamber to the exclusion of said second chamber, a fourth position wherein said second chamber is placed in fluid communication with said tubular connector means to the exclusion of said first chamber, and an intermediate fifth position wherein said first and second chambers and said tubular connector means are rendered fluidly non-communicative, each with the others.

19. The apparatus as defined in claim 18 and further comprising a pressure measuring device in fluid communication with said tubular connector means, a segment of flexible tubing interposed between said pressure measuring device and said tubular connector means, a solenoid-actuated clamp means engaging said flexible tubing and operative between a tube-sealing position and a position allowing said tube to be partially restricted, relay means electrically interconnecting said solenoid-actuated clamp and said contacts, an electrically conductive fluid housed within said second chamber, whereby, upon disengagement of said fluid from the uppermost of said vertically spaced contacts, said relay is operated to actuate said solenoid-actuated clamp into its tube-sealing position, thereby sealing off said pressure measuring device from said tubular member to facilitate undisturbed pressure readings, the level of said conductive fluid being maintained, by manipulation of said liquid level adjusting means, at that level at which equal pressures exist on both surfaces of said fluid at the moment of disengagement of said fluid from the uppermost of said contacts, whereby, upon such fluid disengagement, said pressure measuring device is rendered fluidly non-communicative with said tubular member at the moment equal pressures are caused to exist upon both surfaces of said fluid.

20. The apparatus as defined in claim 19 and further comprising a source of known pressure, leak valve means having a predetermined leak rate, three-way valve means selectively interconnecting said known pressure source and said leak valve means with said tubular member, manually actuated, resilient, gas-filled squeeze-bulb means interposed between said three-way valve means and said tubular member and in fluid communication therewith, valve means interposed between said squeeze-bulb means and said tubular member, and a controlled source of vacuum selectively communicable with said tubular member.

References Cited by the Examiner

UNITED STATES PATENTS

| | | | |
|---|---|---|---|
| 2,293,488 | 8/42 | Bays | 73—38 |
| 2,304,731 | 12/42 | Fairbairn | 73—32 X |
| 2,714,168 | 7/55 | Hencke et al. | 73—401 X |
| 2,729,969 | 1/56 | Innes | 73—38 |
| 2,829,515 | 4/58 | Johnson | 73—38 |
| 3,025,504 | 3/62 | Ohse | 73—401 X |

RICHARD C. QUEISSER, *Primary Examiner.*